United States Patent
Shirota et al.

(10) Patent No.: US 8,606,887 B2
(45) Date of Patent: Dec. 10, 2013

(54) METHOD AND APPARATUS FOR VERIFICATION OF DYNAMIC HOST CONFIGURATION PROTOCOL (DHCP) RELEASE MESSAGE

(75) Inventors: Masakazu Shirota, Yokohama (JP); Jun Wang, La Jolla, CA (US); Raymond Tah-Sheng Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1387 days.

(21) Appl. No.: 12/130,028

(22) Filed: May 30, 2008

(65) Prior Publication Data
US 2008/0313709 A1 Dec. 18, 2008

Related U.S. Application Data (60) Provisional application No. 60/943,795, filed on Jun. 13, 2007.

(51) Int. Cl.
G06F 15/177 (2006.01)
G06F 7/04 (2006.01)

(52) U.S. Cl.
USPC .............................. 709/220; 709/245; 726/3

(58) Field of Classification Search
USPC ................. 709/201–203, 219–229, 238–245; 726/1–4
See application file for complete search history.

(56) References Cited

U.S. PATENT DOCUMENTS

| | | | |
|---|---|---|---|
| 6,070,246 A | 5/2000 | Beser | |
| 7,073,055 B1 | 7/2006 | Freed et al. | |
| 2002/0062485 A1 | 5/2002 | Okana et al. | |
| 2004/0117473 A1 | 6/2004 | Yamamura et al. | |
| 2006/0023683 A1 | 2/2006 | Lee et al. | |
| 2007/0147299 A1* | 6/2007 | Ando et al. | 370/331 |
| 2007/0214352 A1* | 9/2007 | Convery et al. | 713/153 |
| 2008/0089354 A1* | 4/2008 | Yoon et al. | 370/432 |

FOREIGN PATENT DOCUMENTS

| | | |
|---|---|---|
| JP | 2002158701 A | 5/2002 |
| RU | 2005102829 | 11/2005 |
| WO | WO2004006503 A1 | 1/2004 |
| WO | WO2004040827 A2 | 5/2004 |

OTHER PUBLICATIONS

"Dynamic Host Configuration Protocol for IPv6 (DHCPv6)draft-ietf-dhc-dhcpv6-14.txt" Feb. 25, 1999.*
International Search Report—PCT/US08/066450—International Search Authority—European Patent Office—Sep. 19, 2008.
Written Opinion—PCT/US08/066450—International Search Authority—European Patent Office, Munich—Sep. 19, 2008.

(Continued)

Primary Examiner — Yasin Barqadle
(74) Attorney, Agent, or Firm — James T. Hagler (57) ABSTRACT

An apparatus and method for verification of a DHCPRELEASE message comprising extracting a IP address from the ciaddr field of the DHCPRELEASE message, determining a tunnel-associated IP address, comparing the IP address and the tunnel-associated IP address to determine if there is a match, and releasing the IP address if there is a match, and wherein the tunnel-associated IP address is the IP address associated with the tunnel from which the server receives the DHCPRELEASE message.

3 Claims, 5 Drawing Sheets

(56) References Cited

OTHER PUBLICATIONS

3GPP2 C.P0084-000-0, "Overview for Ultra Mobile Broadband (UMB) Air interface Specification", Version 1.0, 31.04.2007, http://www.3gpp2.com/Public_html/specs/alltsgscfm.cfm, http://www.3gpp2.com/Public_html/specs/C.S0084-000-0_v.1.0_070423.pdf, pp. 1-42.
Park, et al., "Rapid Commit Option for the Dynamic Host Configuration Protocol version 4 (DHCPv4)", Network Working Group, Mar. 25, 2005, http://www.ietf.org/rfc/rfc4039.txt.pdf, pp. 1-10.
Taiwan Search Report—TW097122350—TIPO—Apr. 10, 2012.

\* cited by examiner

METHOD AND APPARATUS FOR VERIFICATION OF DYNAMIC HOST CONFIGURATION PROTOCOL (DHCP) RELEASE MESSAGE

CLAIM OF PRIORITY UNDER 35 U.S.C. 119

The present Application for Patent claims priority to Provisional Application No. 60/943,795 entitled Method and Apparatus for Verification of Dynamic Host Configuration Protocol (DHCP) Release Message filed Jun. 13, 2007, and assigned to the assignee hereof and hereby expressly incorporated by reference herein.

FIELD

This disclosure relates generally to apparatus and methods for Internet Protocol (IP) Addresses. More particularly, the disclosure relates to DHCPRELEASE messages associated with the IP.

BACKGROUND

Wireless communication environments are typically not static but rather dynamic. In a wireless communication setting, mobile users employ communication entities, such as an Access Terminal (AT), which need to assume different IP addresses for communicating with other communication entities, such as the various communication stations in an Access Network. As the AT moves locations, the AT is assigned a new IP address (for example, an JPv4 address) and releases its previous IP address (for example, another JPv4 address). The Dynamic Host Configuration Protocol (DHCP) as set forth in Request for Comments (RFC) 2131 by the Internet Engineering Task Force (IETF) can be used for assigning IP addresses such as an JPv4 address in Simple IPv4. Simple JPv4 refers to a service in which an AT is assigned an JPv4 address and is provided IP routing service by a Converged Access Network (CAN).

In the 3rd Generation Partnership Project 2 (3GPP2) CAN, the DHCP mechanism is used for assigning IP addresses (such as JPv4 address in Simple IPv4). The CAN is a specific example of a radio access network (RAN) for converged wireless networks based on the Ultra Mobile Broadband (UMB) technology. When the AT wants to release its IP address (e.g., JPv4 address) before the address lease time expires, the AT sends the DHCPRELEASE message to an Access Gateway/Dynamic Host Configuration Protocol (AGW/DHCP) server. In some instances, the AGW/DHCP server verifies if the request really is from the AT assigned with that IP address (e.g., JPv4 address). The verification ensures that the AGW/DHCP server does not release an IP address assigned to another AT. This type of verification requires security association and management between the AT (i.e., DHCP client) and DHCP server which adds complexity and time delay.

SUMMARY

Disclosed is an apparatus and method for verification of DHCPRELEASE message. In accordance with one aspect, the server (e.g., a DHCP server) verifies that the IP address in the ciaddr field in the DHCPRELEASE message matches with the "tunnel-associated IP address" which is the IP address associated with the tunnel from which the server receives the DHCPRELEASE message. The server verifies the IP address in the ciaddr field with the tunnel-associated IP address stored in the association (or binding information) to see if there is a match. Accordingly, this avoids the need for the execution of the procedures for DHCP message authentication as set forth in RFC 3118. Instead, for example, in a roaming environment, the client (e.g. an AT) can be authenticated expeditiously, reducing complexity and time delay. In one aspect, an access gateway (AGW) functions as the DHCP server.

In one aspect, a method for verification of a DHCPRELEASE message comprises extracting a IP address from the ciaddr field of the DHCPRELEASE message, determining a tunnel-associated IP address, comparing the IP address and the tunnel-associated IP address to determine if there is a match, and releasing the IP address if there is a match.

In another aspect, a method for verification of a DHCPRELEASE message comprises receiving the DHCPRELEASE message via a tunnel, determining if there is a secure link between a client sending the DHCPRELEASE message and a server receiving the DHCPRELEASE message, assuming the client is an authorized client if there is the secure link between the client and the server, extracting the IP address from the ciaddr field of the DHCPRELEASE message, determining a tunnel-associated IP address, comparing the IP address and the tunnel-associated IP address to determine if there is a match, and releasing the IP address if there is a match or discarding the DHCPRELEASE message if there is no match.

In another aspect, an apparatus for verification of a DHCPRELEASE message comprises means for extracting a IP address from the ciaddr field of the DHCPRELEASE message, means for determining a tunnel-associated IP address, means for comparing the IP address and the tunnel-associated IP address to determine if there is a match, and means for releasing the IP address if there is a match.

In another aspect, a circuit apparatus for verification of a DHCPRELEASE message comprises a receive circuit for receiving the DHCPRELEASE message, a memory unit for storing the DHCPRELEASE message, and a central processing unit (CPU) coupled to the memory unit and the receive unit via a central data bus, wherein the CPU: extracts a IP address from the ciaddr field of the DHCPRELEASE message, determines a tunnel-associated IP address, compares the IP address and the tunnel-associated IP address to determine if there is a match, and releases the IP address if there is a match.

In another aspect, a computer-readable medium including program code thereon, which when executed by at least one computer implement a method comprising program code for extracting a IP address from the ciaddr field of the DHCPRELEASE message, program code for determining a tunnel-associated IP address, program code for comparing the IP address and the tunnel-associated IP address to determine if there is a match, and program code for releasing the IP address if there is a match.

In another aspect, a computer-readable medium including program code thereon, which when executed by at least one computer implement a method comprising program code for receiving the DHCPRELEASE message via a tunnel, program code for determining if there is a secure link between a client sending the DHCPRELEASE message and a server receiving the DHCPRELEASE message, program code for assuming the client is an authorized client if there is the secure link between the client and the server, program code for extracting the IP address from the ciaddr field of the DHCPRELEASE message, program code for determining a tunnel-associated IP address, program code for comparing the IP address and the tunnel-associated IP address to determine if there is a match, and program code for releasing the IP address if there is a match or discarding the DHCPRELEASE message if there is no match.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Furthermore, in the following description, for reasons of conciseness and clarity, terminology associated with the Ultra Mobile Broadband (UMB) technology as promulgated under the 3$^{rd}$ Generation Partnership Project 2 (3GPP2) by the Telecommunication Industry Associate (TIA) is used. It should be emphasized that the invention is also applicable to other technologies, such as technologies and the associated standards related to the Code Division Multiple Access (CDMA), Time Division Multiple Access (TDMA), Frequency Division Multiple Access (FDMA), Orthogonal Frequency Division Multiple Access (OFDMA) and so forth. Terminologies associated with different technologies can vary. For example, depending on the technology considered, an access terminal can sometimes be called a mobile terminal, a mobile station, a user equipment, a subscriber unit, etc., to name just a few. Likewise, a base station can sometimes be called an access point, a Node B, and so forth. It here should be noted that different terminologies apply to different technologies when applicable.

In addition, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
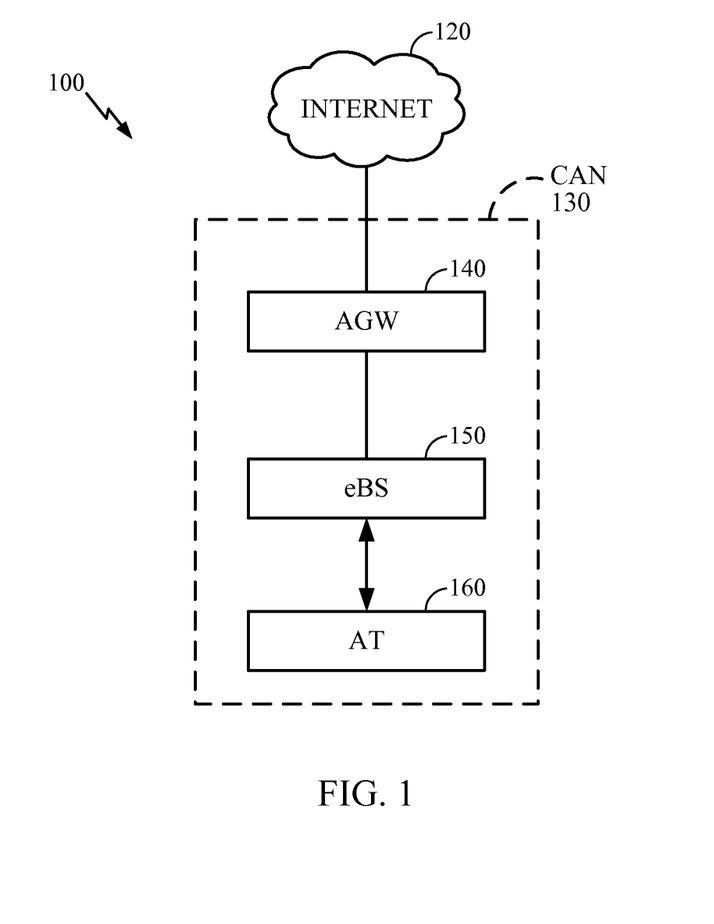
FIG. 1 illustrates an example of a wireless communication system 100.

FIG. 1 illustrates an example of a wireless communication system 100. FIG. 1 shows a backbone network such as the Internet 120. Additionally, a Converged Access Network (CAN) 130 is shown. Within the CAN 130, an evolved Base Station (eBS) 150 is wirelessly connected to an Access Terminal (AT) 160. An Access Gateway (AGW) 140 is also within the CAN 130 as shown in FIG. 1. In this example, as mentioned earlier, within the CAN 130, the Ultra Mobile Broadband (UMB) technology is used. The AT 160 accesses a backbone network (e.g., the Internet 120) via the eBS 150 wirelessly. Again, the wireless link between the AT 160 and the eBS 150 may be based on a number of other wireless technologies such as Code Division Multiple Access (CDMA), Time Division Multiple Access (TDMA), Frequency Division Multiple Access (FDMA), Orthogonal Frequency Division Multiple Access (OFDMA), etc.

The eBS 150 serves as a data exchange entity (a.k.a. data exchange node) between the AT 160 and the AGW 140. The eBS 150 and the AT 160 reside in the CAN 130, as shown in the example of FIG. 1. The AGW 140 has direct access to the backbone network (e.g., the Internet 120). In a wireless environment, the AT 160 is mobile. That is, the AT 160 may move from one location to another, within the same CAN 130 or to a different CAN.

Figure 2:
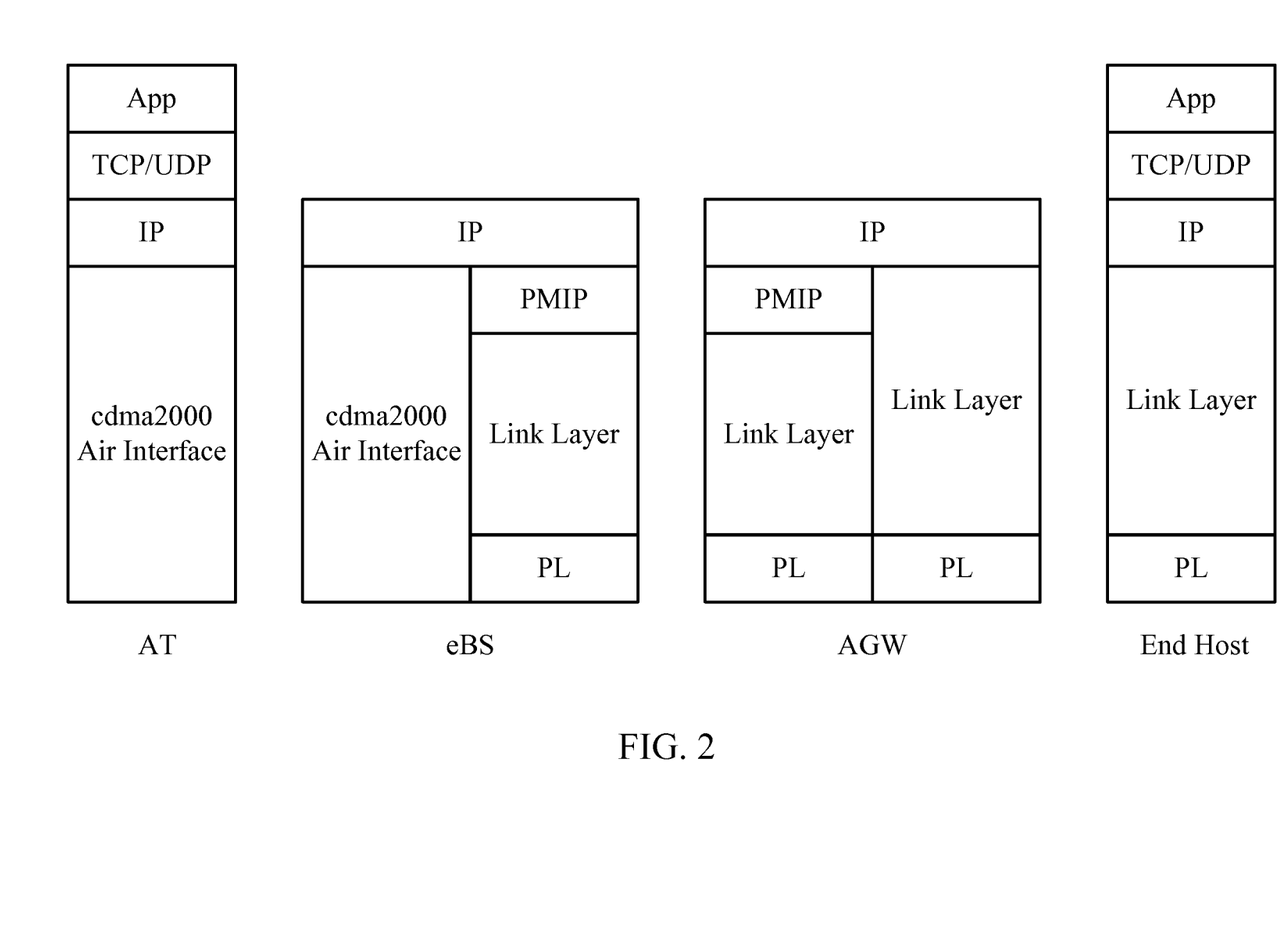
FIG. 2 illustrates the Internet Protocol reference model for Simple JPv4 service.

FIG. 2 illustrates the Internet Protocol reference model for Simple JPv4 service. As shown in FIG. 2, the network nodes (for example, AT, eBS, AGW and End Host) all employ IP as the common network layer protocol over different link layer and physical layer technologies. Each network node is assigned an IP address as part of a global addressing scheme.

In this example, prior to establishing a communication link, the AT 160 needs an IP address, and after a change of communication location, the AT 160 may need a new IP address. One skilled in the art would understand that a variety of IP addresses can be used depending on the version of the Internet Protocol (IP). Some examples of IP addresses are IPv4, etc. One skilled in the art would understand that the spirit and scope of the present disclosure is not limited to particular types of IP addresses mentioned herewith which only serve as examples.

The backbone network (e.g., the Internet 120) may be connected to a variety of heterogeneous networks, that is, networks using different access protocols and standards. This variety of heterogeneous networks introduces the problem of internetworking since it requires communicating across networks with different access protocols and standards. To solve the internetworking problem, the ATs use a common internetworking protocol, for example, the Internet Protocol (IP). The IP allows all ATs connected to various heterogeneous networks to communicate with each other (e.g., exchange messages, data, images, video streams, etc. over a common interface).

Typically, the internetworking environment is not static, but dynamic. An AT may require different IP addresses at different locations. The Dynamic Host Configuration Protocol (DHCP) (which is compatible with the Internet Protocol (IP)) provides mechanisms for allocating IP addresses dynamically so that IP addresses may be re-allocated when ATs no longer need them. The DHCP is defined in RFC 2131 published by the Internet Engineering Task Force (IETF). In conventional practice, DHCP messages may be verified using an authentication process as defined in, for example, RFC 3118. However, the authentication process may require substantial network management overhead communications between the AT and its DHCP server. One skilled in the art would recognize that a variety of DHCP servers may be used without affecting the spirit and scope of the present disclosure. In one example, the AGW 140 (shown in FIG. 1) functions as the DHCP server (hereafter "AGW/DHCP server").

The Dynamic Host Configuration Protocol (DHCP) as set forth in RFC 2131 by the Internet Engineering Task Force (IETF) is used for assigning an IP address (such as an JPv4 address in Simple IPv4). Additionally, when the AT 160 moves out of the CAN 130 to another CAN before the address lease time expires, the AT 160 needs to release the IP address (e.g., JPv4 address) so that the IP address can be reused by other ATs. To accomplish this, the AT 160 sends a DHCPRELEASE message to the DHCP server (e.g., AGW/DHCP server).

Figure 3:
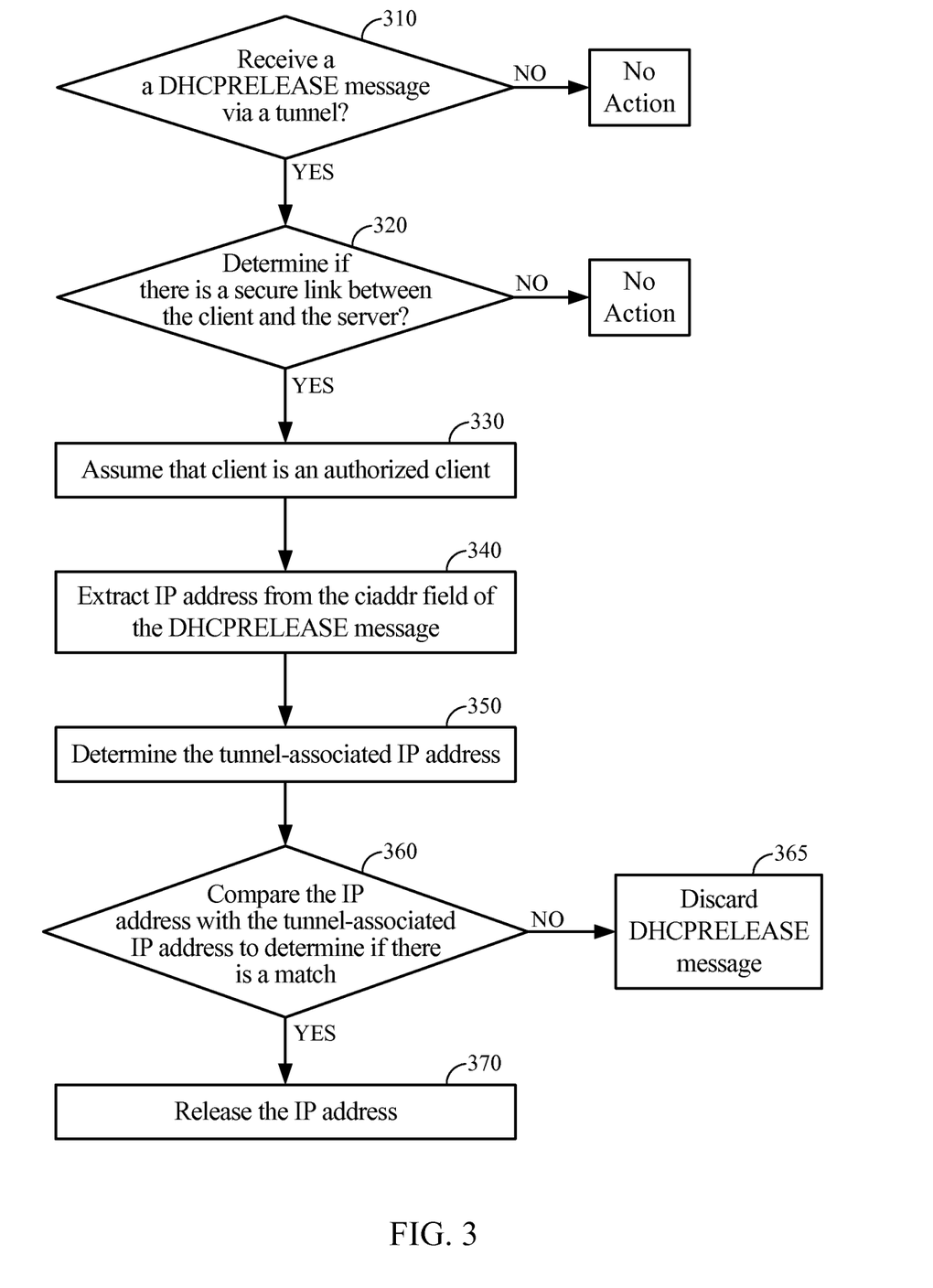
FIG. 3 is a flow diagram illustrating an example processes for verification of a DHCPRELEASE message.

FIG. 3 is a flow diagram illustrating an example process for verification of a DHCPRELEASE message. In block 310, a DHCPRELEASE message via a tunnel is received. A tunnel is a lower layer link below the IP layer. For example, as shown in FIG. 2, a tunnel is established between the AGW and the eBS through the proxy mobile IP (PMIP). The DHCPRELEASE message is sent by a client and received by a server. In one example, the server is a DHCP server. In another example, the AGW 140 functions as the DHCP server. A client sends the DHCPRELEASE message when it no longer needs an IP address, wants to move or has moved locations and needs a new IP address. In one aspect, the client is the AT 160, and the AT 160 supports wireless technology. The AT 160 can be a mobile phone, a personal digital assistant (PDA) unit or a computer terminal. In one example, the IP address is an JPv4 address. One skilled in the art would recognize that other forms of IP address may be used without affecting the spirit or scope of the disclosure. If no DHCPRELEASE message is received, no action is taken. If a DHCPRELEASE message is received, proceed to block 320.

In block 320, there is a determination if there is a secure link between the client (for example, AT 160) and the server (for example, DHCP server). If there is not, no action is taken. If there is a secure link between the client (for example, AT 160) and the server (for example, DHCP server), proceed to block 330 where an assumption is made that the client is an authorized client. The secure link can include encryption. Or, the secure link is an authorized link without encryption. In one aspect, the secure link between the client and the server is via the eBS. One skilled in the art would understand that other criteria for deciding that a client is an authorized client may be used without affecting the spirit or scope of the present disclosure. Following block 330, proceed to block 340.

In block 340, the IP address is extracted from the "ciaddr" field of the DHCPRELEASE message. Following block 340 in block 350, determine the tunnel-associated IP address. The tunnel-associated IP address is the IP address associated with the tunnel from which the server receives the DHCPRELEASE message. It is the IP address stored in the binding information at the server. The server (for example, the DHCP server) maintains the binding information between the IP address (e.g., JPv4 address, etc.) assigned to the client (for example, the AT 160) and the tunnel that exists between the eBS and the server for the client. Where the AGW functions as the DHCP server, the AGW maintains the binding information between the IP address (e.g., JPv4 address, etc.) assigned to the AT and the tunnel that exists between the eBS and AGW for the AT.

In block 360, following block 350, the IP address is compared with the tunnel-associated IP address to determine if there is a match (i.e., the IP address and the tunnel-associated IP address are identical). If there is no match, the DHCPRELEASE message is discarded in block 365. If there is a match, proceed to block 370 where the IP address is released.

To release an IP address, the AGW functions as the DHCP server and supports the Simple JPv4 operation. If the AGW receives the DHCPRELEASE message from the AT before the IP address lease time expires, the AGW first verifies that the IP address in the ciaddr field in the DHCPRELEASE message is identical to the IP address that is associated with the tunnel from which the AGW receives the DHCPRELEASE message. If the IP addresses match, the AGW marks the assigned IP address as not allocated. If the IP addresses do not match, the AGW silently discards the DHCPRELEASE message. When the IP address lease time expires, the AGW marks the assigned IP address as not allocated.

For DHCPv4 support, the AGW acts either as a DHCPv4 relay agent or a DHCPv4 server. If the AGW acts as a DHCP Relay Agent, the AGW relays the DHCP messages between the DHCPv4 server and AT according to RFC 1542 and RFC 3046. The AGW includes a DHCP Relay Agent Information option (e.g., according to RFC 3046) when relaying DHCP messages to the server and sets the giaddr field to the relay agent IP address. The AGW supports RFC 3527 to indicate the link on which the DHCP client (i.e., AT) resides if it is different from the link from which the DHCPv4 relay agent is communicating with the DHCPv4 relay server. If the AGW acts as a DHCP server, the AGW supports both RFC 2131 and RFC 4039.

Regarding Ingress Address filtering, the AGW checks the source IP address of every packet received per AT tunnel between the access node (AN) and AGW. In one example, the access node is the AT. Upon receiving packets from the AT with an invalid source IP address, the AGW discards the packets.

The AT may support Simple JPv4 operation. In one aspect, the IP address assignment is performed with DHCP with Rapid Commit Option (e.g., according to RFC 4039). After a successful authentication and AT tunnel establishment between the AN and AGW, the LinkID (e.g., according to C.S0084-008) is assigned to the AT. In one example, the access node is the AT. After the LinkID is assigned, the AT broadcasts the DHCPDISCOVER message with Rapid Commit option to the AN. When the AT receives the DHCPACK with Rapid Commit, the AT configures its IP address with the IP address in the "yiaddr" field. If the lower layer handoff is performed and a different LinkID from the one stored in the AT is assigned, the AT sends the DHCPDISCOVER message with Rapid Commit option to the AN to reconfigure its IP address. All other DHCP/DHCP with Rapid Commit Option operations comply with RFC 2131 and RFC 4039.

In one aspect, the IP address assignment is performed with DHCP without Rapid Commit Option (e.g., according to RFC 2131). After a successful authentication and AT tunnel establishment between the AN and AGW, the LinkID (e.g., according to C.S0084-008) is assigned to the AT. After the LinkID is assigned, the AT broadcasts the DHCPDISCOVER message to the network. After the AT receives the DHCPOFFER message from the AGW, the AT sends the DHCPREQUEST message with the 'server identifier' option. The 'requested IP address' option shall be set to the value of yiaddr contained in the DHCPOFFER message from the AGW. The AT may include other options specifying desired configuration values. When the AT receives the DHCPACK message from the AGW, the AT configures its IP address with the IP address in the yiaddr field. If the lower layer handoff is performed and a different LinkID from the one stored in the AT is assigned, the AT sends the DHCPDISCOVER message to the AN to reconfigure its IP address. All other DHCP operations comply with RFC 2131.

If the AT wants to release assigned IP address before the IP address lease time expires, the AT sends the DHCPRELEASE message to the AGW. If the IP address lease time expires and the AT no longer requires Simple JPv4 services, the AT releases the assigned IP address. The AT supports RFC 2131 and RFC 4039 operations.

Figure 4:
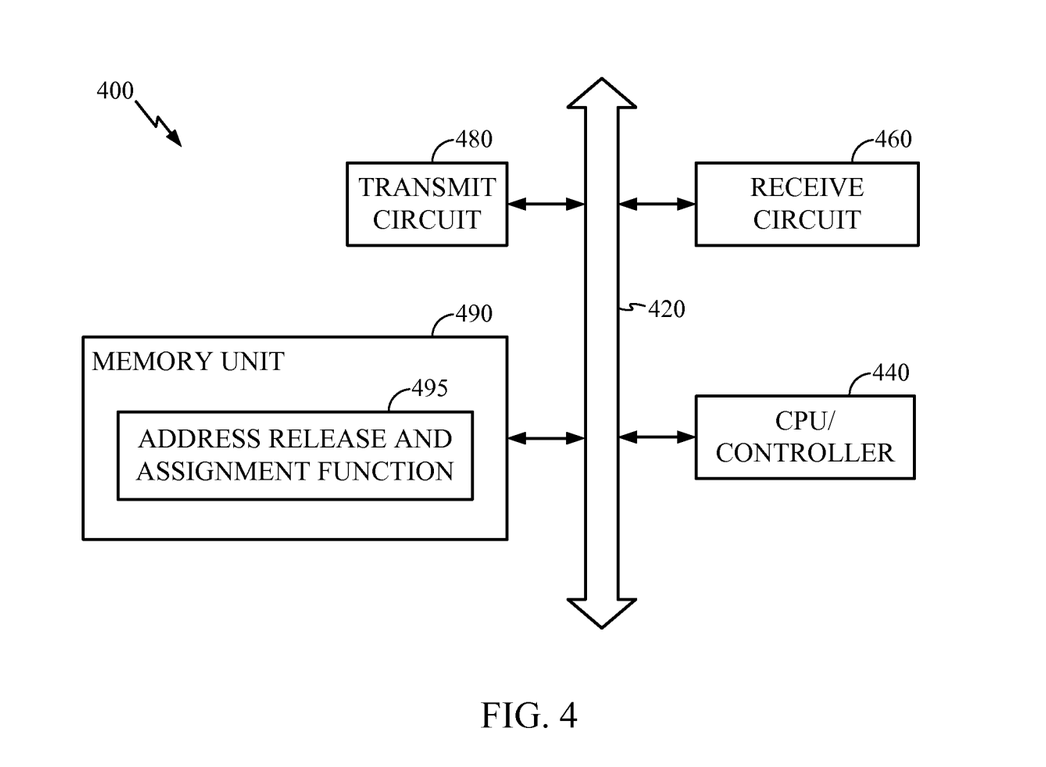
FIG. 4 schematically illustrates an example of a hardware implementation for executing the flow diagram illustrated in FIG. 3.

FIG. 4 schematically illustrates an example of a hardware implementation for executing the flow diagram illustrated in FIG. 3. FIG. 4 shows a circuit apparatus 400. The circuit apparatus is implemented inside the AGW. Alternatively, the circuit apparatus 400 is implemented in the eBS or is built into an AT. For example, in an AT-assisted mode, information concerning the address release and/or assignment process is sent to the AT. The determination for address release and/or assignment arrived at thereafter is sent back to the AGW or the DHCP server for execution.

As shown in the example in FIG. 4, the circuit apparatus 400 comprises a central data bus 420 which links a CPU (Central Processing Unit)/controller 440, a receive circuit 460, a transmit circuit 480, and a memory unit 490.

The circuit apparatus 400 is a wireless device with the receive circuit 460 and transmit circuit 480 connected to a RF (Radio Frequency) circuit (not shown). The receive circuit 460 processes and buffers received signals before sending them to the data bus 420. On the other hand, the transmit circuit 480 processes and buffers the transmit signals from the data bus 420 before transmitting them. The functions of the CPU/controller 440 include data management of the data bus 420 and general data processing which may include executing the instructions stored in memory unit 490. In one aspect, the receive circuit 460 and the transmit circuit 480 are part of the CPU/controller 440, and the memory unit 490 includes a set of instructions which may be stored in at least one modules (not shown) within the memory unit 490. In one example, one of the modules 495 includes an address release and assignment function which is executed by the CPU/controller 440. The memory unit 490 can be a separate computer product from the circuit apparatus 400.

The memory unit 490 is a RAM (Random Access Memory) circuit which can include software routines, modules and/or data sets. The memory unit 490 can be tied to other memory circuits (not shown) which can either be of the volatile or nonvolatile type. In other alternative aspects, the memory unit 490 is made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk or others known in the art.

One skilled in the art would understand that the techniques described herein may also be coded as computer-readable instructions carried on any computer-readable medium known in the art. In this specification and the appended claims, the term "computer-readable medium" refers to any medium that participates in providing instructions to any processor, such as but not limited to the CPU/controller 440 shown and described in FIG. 4, for execution. In one aspect, such a medium is of the storage type and takes the form of a volatile or non-volatile storage medium, for example, as in the memory unit 490 in FIG. 4. Alternatively, such a medium is of the transmission type and includes a coaxial cable, a copper wire, an optical cable, and the air interface carrying acoustic, electromagnetic or optical waves capable of carrying signals readable by machines or computers. In this disclosure, signal-carrying waves, unless specifically identified, are collectively called medium waves which include optical, electromagnetic, and acoustic waves.

Figure 5:
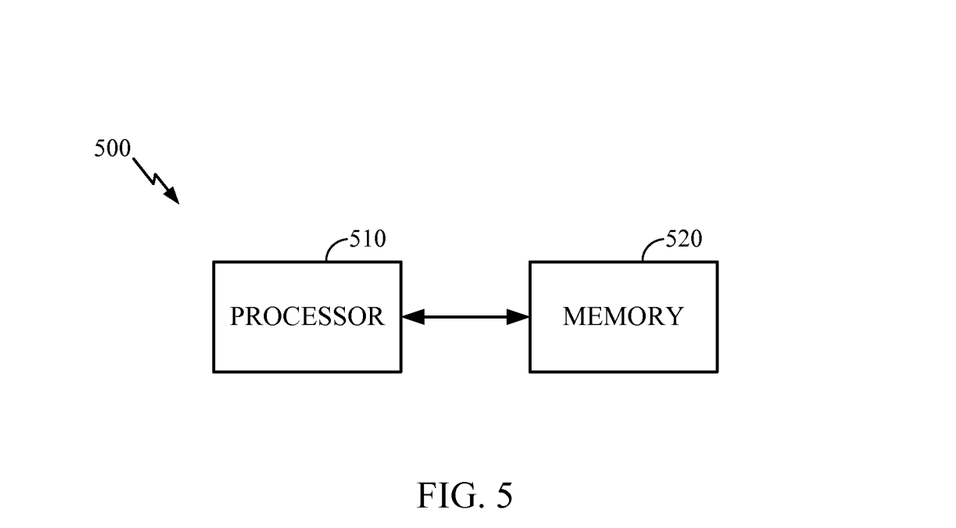
FIG. 5 illustrates an example of a device comprising a processor in communication with a memory for executing the processes for verification of a DHCPRELEASE message.

The various illustrative flow diagrams, logical blocks, modules, and/or circuits described herein may be implemented or performed with one or more processors. In one aspect, a processor is coupled with a memory which stores data, meta data, program instructions, etc. to be executed by the processor for implementing or performing the various flow diagrams, logical blocks, modules, and/or circuits described herein. FIG. 5 illustrates an example of a device 500 comprising a processor 510 in communication with a memory 520 for executing the processes for verification of a DHCPRELEASE message in accordance with the descriptions herein. In one example, the device 500 is used to implement the processes illustrated in FIG. 3. The memory 520 is located within the processor 510, or the memory 520 can be external to the processor 510. A processor may be a general purpose processor, such as a microprocessor, a specific application processor, such a digital signal processor (DSP), or any other hardware platform capable of supporting software. Software shall be construed broadly to mean any combination of instructions, data structures, or program code, whether referred to as software, firmware, middleware, microcode, or any other terminology. Alternatively, a processor may be an application specific integrated circuit (ASIC), a programmable logic device (PLD), a field programmable gate array (FPGA), a controller, a micro-controller, a state machine, a combination of discrete hardware components, or any combination thereof. The various illustrative flow diagrams, logical blocks, modules, and/or circuits described herein may also include computer readable medium for storing software. The computer readable medium may also include one or more storage devices, a transmission line, or a carrier wave that encodes a data signal.

Figure 6:
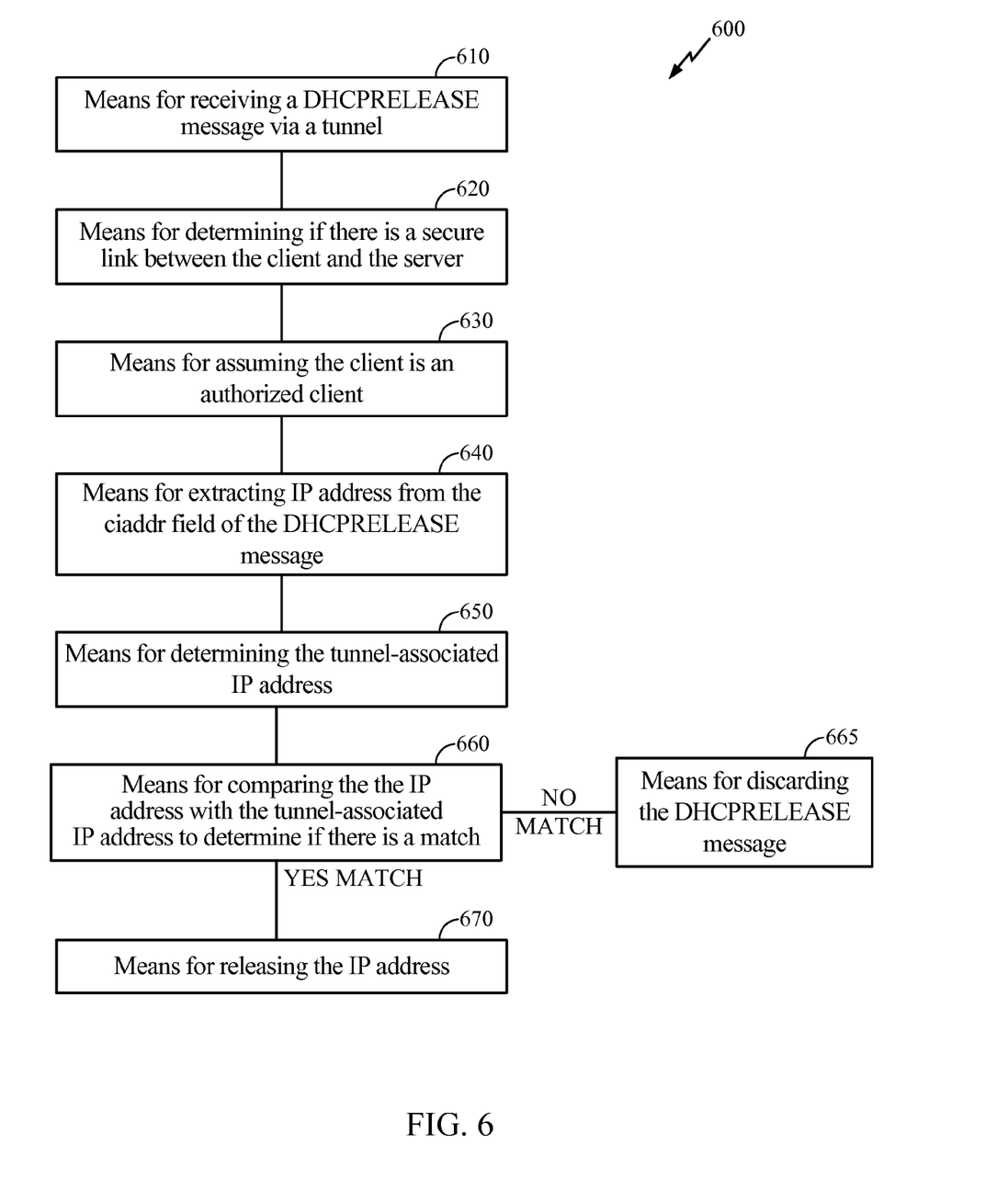
FIG. 6 illustrates another example of a device suitable for verification of the DHCPRELEASE message.

FIG. 6 illustrates another example of a device 600 suitable for verification of the DHCPRELEASE message. In one aspect, the device 600 is implemented by at least one processor comprising one or more modules configured to provide verification of the DHCPRELEASE message as described herein in blocks 610, 620, 630, 640, 650, 660 and 670. For example, each module comprises hardware, software, or any combination thereof. The device 600 is also implemented by at least one memory in communication with the at least one processor. The device 600 comprises a first module comprising means 610 for receiving a DHCPRELEASE message. The device 600 comprises a second module comprising means 620 for determining if there is a secure link between a client and a server. In one aspect, the client is the AT. The server is a DHCP server, or an AGW can function as the DHCP server. The device 600 comprises a third module comprising means 630 for making the decision that the client is an authorized client. The decision is based on whether or not there is a secure link between the client and the server. The secure link between the client and the server is via the eBS. The device 600 comprises a fourth module comprising means 640 for extracting the IP address from the ciaddr field of the DHCPRELEASE message. The device 600 comprises a fifth module comprising means 650 for determining the tunnel-associated IP address. The device 600 comprises a sixth module comprising means 660 for comparing the IP address with the tunnel-associated IP address to determine if there is a match. The device 600 comprises a seventh module comprising means 670 for releasing the IP address if there is a match. The device 600 comprises an eighth module comprising means 665 for discarding the DHCPRELEASE message. The DHCPRELEASE message is discarded when there is no match between the IP address and the tunnel-associated IP address. One skilled in the art would understand that a variety of IP addresses (such as but not limited to IPv4, etc.) can be used depending on the version of the Internet Protocol (IP) without affecting the spirit or scope of the present disclosure. Some examples of IP addresses are JPv4 addresses, etc.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for verification of a DHCPRELEASE message comprising:
   receiving the DHCPRELEASE message at a server via a tunnel;
   determining if there is a secure link between a client sending the DHCPRELEASE message and the server receiving the DHCPRELEASE message;
   assuming the client is an authorized client if there is the secure link between the client and the server;
   extracting the Internet Protocol (IP) address from a ciaddr field of the DHCPRELEASE message;
   determining a tunnel-associated IP address, wherein the tunnel-associated IP address is an IP address associated with the tunnel from which the server receives the DHCPRELEASE message;
   comparing the IP address and the tunnel-associated IP address to determine if there is a match; and
   releasing the IP address if there is a match or discarding the DHCPRELEASE message if there is no match.

2. The method of claim 1 wherein the client is an access terminal and the server is an Access Gateway/Dynamic Host Configuration Protocol (AGW/DHCP) server.

3. A non-transitory computer-readable medium having stored thereon processor-executable instructions configured to cause a processor to perform operations, comprising:
   receiving a DHCPRELEASE message at a server via a tunnel;
   determining if there is a secure link between a client sending the DHCPRELEASE message and the server receiving the DHCPRELEASE message;
   assuming the client is an authorized client if there is the secure link between the client and the server;
   extracting the IP address from a ciaddr field of the DHCPRELEASE message;
   determining a tunnel-associated IP address, wherein the tunnel-associated IP address is an IP address associated with the tunnel from which the server receives the DHCPRELEASE message;
   comparing the IP address and the tunnel-associated IP address to determine if there is a match; and
   releasing the IP address if there is a match or discarding the DHCPRELEASE message if there is no match.

* * * * *